Dec. 16, 1969 RYO KOKUBO ET AL 3,484,440
PROCESS FOR PRODUCING HIGH PURITY MELAMINE
Filed July 20, 1967

United States Patent Office 3,484,440
Patented Dec. 16, 1969

3,484,440
PROCESS FOR PRODUCING HIGH PURITY
MELAMINE
Ryo Kokubo and Yasuo Takakuwa, Toyama Prefecture, and Mitsuhiro Koguchi and Mizuhiko Nagakura, Chiba Prefecture, Japan, assignors to Nissan Kagaku Kogyo Kabushiki Kaisha, Tokyo, Japan, a corporation of Japan
Filed July 20, 1967, Ser. No. 654,902
Claims priority, application Japan, July 22, 1966,
41/47,872
Int. Cl. C07c 55/30
U.S. Cl. 260—249.7                                           7 Claims

ABSTRACT OF THE DISCLOSURE

A process for producing high purity melamine using ammonia at a weight ratio of 0.2–1.0 g. of ammonia per gram of urea, which comprises the steps of producing melamine from urea, holding the liquid melamine and gas obtained for more than 1 hour with the gaseous melamine concentration equal to or more than the theoretical mol percent of the melamine in the total reaction product, converting the impurities into melamine in the course of the transition of the melamine to its gaseous phase and obtaining all the melamine in its gaseous phase.

---

Figure 1:
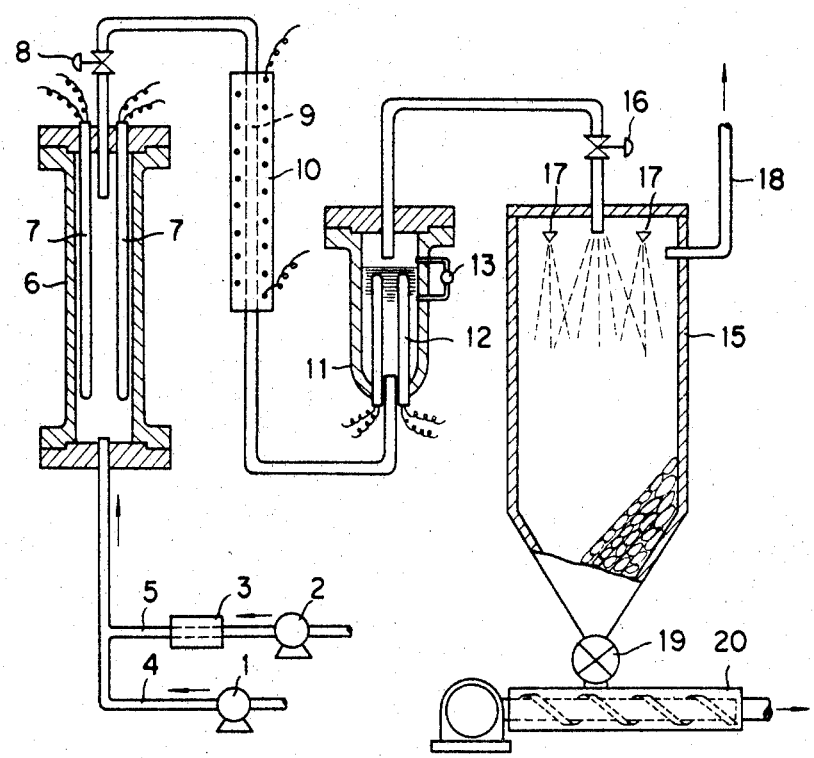

The present invention relates to an improvement in the process for producing a high-purity melamine which employs urea as a raw material.

The problems encountered in the industrial production of melamine from urea are: the possibility that the solids formed during reaction may accumulate in the form of a deposit and block the progress of the reaction; intense corrosion of the apparatus by the reactants; necessity of refining the melamine as a resin material; necessity of separating and recovering large quantities of waste gas, etc.

To eliminate these problems, various proposals have been made. For example, as disclosed in British patent specification No. 800,722 it has been well-known that a high-purity melamine will be produced, if urea and a large amount of ammonia gas are supplied to a reactor, which is heated from the outside to a temperature of 350–450° C. at a pressure of 20–200 kg./cm.$^2$ (gauge pressure), and the generated gas is discharged from the top of the reactor and quenched. This is what might be called the gas phase extraction method. This method, in which the melamine is extracted from the system while in the gaseous phase in which there is therefore no possibility of the melamine being decomposed under reduced pressure into the products of an ammonia-removing condensation such as melam, melem, etc., has definite merit, but it requires large quantities of ammonia and this ammonia is discharged as a mixture with the reaction-produced carbon dioxide gas. It is therefore unprofitable on account of the extremely high cost of separating, recovering and reusing the ammonia.

It has also been proposed that the reacting pressure be lowered for the purpose of relatively decreasing the quantities of added ammonia, but research by the present inventors indicates that the decrease of the total pressure to less than 50 kg./cm.$^2$ (gauge pressure) in the noncatalytic liquid phase reaction results in the formation of massive deposits solids within the reactor, rendering the smooth operation of the reactor impossible.

After various investigations to solve these problems, the present inventors learned that the following process of production is satisfactory. Using ammonia at a weight ratio of 0.2–1.0 g. of ammonia per gram of urea, melamine is produced from urea at 50–150 kg./cm.$^2$ (gauge pressure) and about 360–400° C. The liquid melamine and gas obtained are held for more than 1 hour under the conditions of temperature and pressure shown by the shaded areas in FIGURE 2 to assure a gaseous melamine concentration equal to or greater than the theoretical mol percent of melamine in the total reaction product, within the range of 40–100 kg./cm.$^2$ (gauge pressure) and about 420–480° C. In the course of the transition of melamine to the gaseous phase, the impurities are converted into melamine. Thus, this is a process for producing a high-purity melamine characterized by extracting practically all melamine in the gaseous phase.

Figure 2:
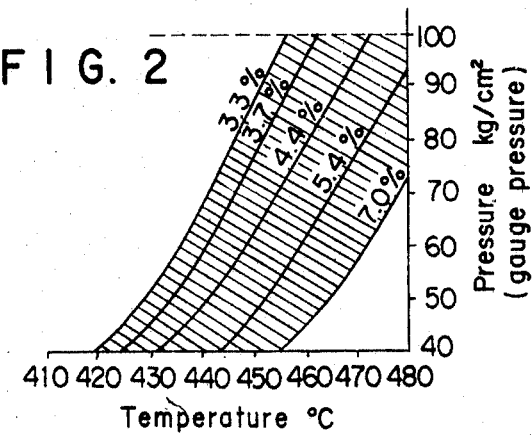

An exemplary process utilizing the present invention will now be described with reference to the accompanying drawing, in which:

FIGURE 1 is a schematic view partially in section showing the apparatus comprised in a typical system for carrying out the inventon; and FIGURE 2 is a diagram showing the relationship between the molar concentration of gaseous phase melamine and the temperature and pressure of the evaporator.

The tests were carried out in the following manner:

The consumption of ammonia in this method is selected to fall within the range of 0.2–1.0 g. of ammonia per gram of urea. At a ratio of less than 0.2 g. of ammonia per gram of urea the melamine formed will be unstable, with a segregation of solids which will accumulate to form heavy deposits on the reactor.

If the ratio is more than 1.0 g. of ammonia per gram of urea the apparatus and its operation for the purpose of separating and recovering the ammonia will be very expensive.

The melamine is produced from urea at 50–150 kg./cm.$^2$ (gauge pressure) and about 360–400° C. When the pressure is lower than 50 kg./cm.$^2$ (gauge pressure), solids will be precipitated and accumulate in the form of heavy deposits on the reactor. If it exceeds 150 kg./cm.$^2$ (gauge pressure), the state of the art imposes a restriction on the selection of reactor material. On the other hand, a reaction temperature of lower than 360° C. is insufficient to promote the reaction, and a temperature higher than 400° C. has a tendency to cause corrosion and weakening of the reactor material.

Next, the composition of a liquid reaction product taken out of the reactor after reaction at 400° C., under a pressure of 100 kg./cm.$^2$ (gauge pressure) is given as follows:

|  | Percent |
|---|---|
| Melamine | 95.2 |
| Melam | 2.0 |
| Monoureidomelamine | 1.3 |
| Urea | 0.9 |
| Ammeline | 0.4 |
| Melem | 0.2 |

The liquid melamine and gas thus formed are introduced into the evaporator and there practically all the melamine is transformed into the gaseous phase. The conditions for transforming into the gaseous phase are such that, within the range of 40–100 kg./cm.$^2$ (gauge pressure) and about 420–480° C., as shown in FIGURE 2, a vapor pressure of melamine which is equal to or greater than the theoretical mol percent of the melamine in the total reaction product, may be assured.

If, in this case, the pressure is less than 40 kg./cm.$^2$ (gauge pressure), the products of ammonia-removing condensation such as melam, melem, etc. will occur in large quantities, resulting in poor fluidity, which may lead to blocking of the reaction.

On the contrary, a pressure higher than 100 kg./cm.$^2$ (gauge pressure) would be theoretically favorable but is undesirable from the standpoint of selecting the material for the evaporator which is exposed to higher temperatures than the reactor. Meanwhile, if the temperature is lower than about 420° C., perfect transition of melamine to gas phase will not take place (for reasons which will be described later). But when it is higher than about 480° C., the products of the ammonia-removing condensation such as melam, melem, etc. will be formed in large quantities, causing poor fluidity and possibly an undesirable blocking of the reaction.

Next, the vaporization of melamine and the conversion of impurities into melamine in the evaporator will be described in detail as follows.

When the liquid melamine and gas from the reactor are heated in the evaporator to 450° C. under a reduced pressure of, say, 50 kg./cm.$^2$ (gauge pressure), melamine will turn into the gaseous phase and it might be thought that impurities must be accumulated steadily within the evaporator. But as a matter of fact, the impurities will gradually be converted into melamine; and if the liquid melamine is held for over one hour in the evaporator, the impurities, after attaining a certain concentration, will no longer be accumulated. This is an important discovery.

This phenomenon will now be explained on the basis of the results of experimental study.

Ammonia was added to the impurities in the reactant and the whole mass was held within the autoclave at 450° C., 50 kg./cm.$^2$ (gauge pressure), producing the following results:

| | Original composition, percent | Composition after 1 hr. heating, percent | Composition after 5 hrs. heating, percent |
|---|---|---|---|
| Melamine | 0 | 83.0 | 83.4 |
| Melam | 41.6 | 6.2 | 6.0 |
| Monoureidomelamine | 27.2 | 5.3 | 5.1 |
| Urea | 19.7 | 0.5 | 0.5 |
| Ammeline | 8.3 | 2.0 | 2.0 |
| Melem | 4.2 | 3.0 | 3.0 |

The composition of the pressure gas (when using 0.4 weight ratio of ammonia to urea) is ammonia 83%, carbon dioxide gas 17%.

The above table shows that the impurities in the liquid melamine are converted into melamine gradually under the pressure of a gas including ammonia.

In the industrial, continuous apparatus, the lower the purity of liquid melamine within the evaporator, the greater the extent to which the transition of impurities into melamine will be promoted; but when the purity of the solution falls, the insolubles such as ammeline, melem, etc. will be precipitated, damaging the apparatus. For this reason, an appropriate means of preventing the separation of impurities is to keep the melamine concentration of the liquid melamine at over 80%. For this purpose, the time during which the liquid melamine remains in the evaporator should be longer than one hour. Economically one to two hours would be adequate.

As for the vapor pressure of melamine under pressure, there is no definite data available. Under pressure, the gas-liquid composition can be calculated by finding the equilibrium constant of evaporation, i.e., the activity ratio between liquid and gaseous phases; it is usually different from the results of simple calculation according to the ideal gas P-V-T relation. Especially, between melamine and ammonia, i.e., two compounds which have strong affinity to each other, there is a large deviation from the ideal solution. Though the present inventors could not reduce this relationship to a methematical formula, we utilized the results of measuring the melamine concentration in the gaseous phase composed of 85% ammonia and 15% carbon dioxide gas under 40–100 kg./cm.$^2$ (gauge pressure) for the purpose of finding the quantity of melamine which goes into the gaseous phase, as illustrated in FIG. 2 showing the mol concentration diagram of gaseous phase melamine.

The basic reaction for production of melamine from urea in the presence of ammonia takes place as follows:

$$6CO(NH_2)_2 + nNH_3 = C_3H_6N_6 + 3CO_2 + 6NH_3 + nNH_3$$

From the above formula, the ammonia consumption in terms of mols and the percentage of the theoretically formed melamine volume in terms of mols to the total theoretical product in terms of mols $$\left(\frac{1}{10+n} \times 100\right)$$

(herein referred to as the theoretical mol percent of melamine) are obtained as follows:

| | $n$ (consumed ammonia in terms of mols) | Theoretical melamine mol, percent |
|---|---|---|
| Ammonia/urea (weight ratio): | | |
| 0.2 | 4.24 | 7.0 |
| 0.4 | 8.47 | 5.4 |
| 0.6 | 12.7 | 4.4 |
| 0.8 | 16.9 | 3.7 |
| 1.0 | 20.6 | 3.3 |

Therefore, the temperature and pressure of the evaporator are appropriately selected from the gaseous phase melamine mol concentration curve in FIG. 2 which agrees with the theoretical melamine mol percent or in the range to the right of this curve which is indicated by the shade lines. Thus a gaseous phase melamine concentration equal to or higher than the theoretical mol percent of the melamine in the total reaction product is obtained, and the conversion of the impurities into melamine as well as the vaporization of melamine takes place simultaneously, resulting in the continuous extraction of the total amount of melamine in its gaseous phase.

Next, the present invention is further described with reference to FIGURE 1.

Molten urea at 140° C. enters through the pump 1 and the pipe 4, and ammonia gas at 400° C. enters through the pump 2, the heater 3 and the pipe 5, respectively into the bottom of the steel reactor 6 which is lined with titanium or "Hastelloy." The reactor 6 is heated to about 360–400° C. by the electric heater 7 having two heating elements and held at 50–150 kg./cm.$^2$ (gauge pressure) by the pressure control valve 8. The reactant liquid and gas which have passed through the pressure control valve 8 pass through the heating tube 9 into the evaporator 11 which is lined with titanium or "Hastelloy." The heating tube 9, which is a metallic conduit made of titanium, a titanium alloy or "Hastelloy," is externally heated by the electric heater 10. The evaporator 11, in which the liquid melamine and gas are fully mixed, is operated with a saturated melamine concentration in the gas. The temperature is controlled to about 420–480° C. by the electric heater 12, so that the liquid level in the evaporator 11 is kept constant as shown by the level gauge 13 attached to the evaporator 11. The pressure between the pressure control valves 8 and 16 is held at 40–100 kg./cm.$^2$ (gauge pressure) by the pressure control valve 16. The gas coming out of the evaporator 11 contains a saturated vapor of melamine at given temperatures and the other impurities it contains are nothing but very small quantities of urea, melam, etc. The separator 15 is operated at approximately atmospheric pressure and cooled at 150° C. by the water spray 17. The melamine which is condensed and solidified there is removed by the rotary valve 19 and the screw feeder 20, and the waste gas is discharged through the pipe 18. The melamine powder obtained is about 99% pure and contains such impurities as urea or melam; this represents a raw material for resin which needs no further refining.

Next, this invention will be explained with reference to a specific example.

EXAMPLE

Molten urea was introduced into a titanium-lined reactor having a 1.1 m. inner diameter and 5 m. in height, at 140° C. at a rate of 1860 kg./hr., together with ammonia gas at 400° C. at a rate of 930 kg./hr.; and the entire mass was heated by a 800 kw. electric heater having two heating elements built into the reactor to cause melamine formation at 400° C. Pressure control valve 8 held the pressure in the reactor at 100 kg./cm.$^2$ (gauge pressure). According to the results of reaction product analysis, the obtained melamine was 95.2% pure and the impurities included melam 2.0% monoureidomelamine 1.3%, urea 0.9%, melem 0.2% and ammeline 0.4%. The liquid reaction product and the gas formed were heated to 450° C. within the heating tube 9 of "Hastelloy B," which was 30 mm. in inner diameter and 50 m. in length, by the 100 kw. electric heater attached outside. Then the liquid melamine and gas passed into the evaporator lined with "Hastelloy C," which was 1 m. in inner diameter and 2 m. long, and was connected to the end of the heating tube. By adjusting the temperature to 450° C.±5° C. by means of the 50 kw. electric heater installed at the bottom of the evaporator, the evaporation of melamine was controlled and the liquid level of the evaporator was held at 1.2 m. above the bottom. The heating tube and the evaporator were held for at least an hour at 50 kg./cm.$^2$ (gauge pressure) by pressure control valve 16. The gas as discharged out of the upper space in the evaporator went through the pressure control valve 16 into the separator, with the perssure reduced. The separator was cooled to 150° C. by a water spray of 670 kg./hr. and the condensed melamine powder was removed from the bottom. The liquid melamine at the bottom of the evaporator had a melamine purity of 85.8% and no tendency of impurities to accumulate with time was observed. The separator produced melamine powder at a rate of 630 kg./hr., the melamine purity being 99.2% and the yield 96% based on the urea.

What is claimed is:

1. A process for producing a high-purity melamine, said process comprising the steps of reacting ammonia and urea in the ratio of 0.2–1.0 grams of ammonia per gram of urea under a gauge pressure of 50–150 kg./cm.$^2$ at a temperature of about 360–400° C., and holding the liquid melamine and gas resulting from said reaction for over one hour under a gauge pressure of at least 40 kg./cm.$^2$ and a temperature of 420–480° C. which will bring the concentration of gaseous phase melamine to a value at least equal to the theoretical mol percent of melamine in the total reaction product, so as to convert impurities formed during said reaction into melamine while causing the transition of melamine into its gaseous phase.

2. A process as claimed in claim 1 in which said gaseous melamine is then condensed by cooling.

3. A process as claimed in claim 1 in which the gauge pressure at which said liquid melamine and gas are held is no greater than 100 kg./cm.$^2$.

4. A process as claimed in claim 1 in which the combination of temperature and pressure at which said liquid melamine and gas are held is selected from those defined by a single point falling in the shaded areas of FIGURE 2 to the right of the curve representing the theoretical mol percent of the melamine in the reaction product, and those defined by a single point along said curve.

5. A process as claimed in claim 4 in which the curves marked 3.3%, 3.7%, 4.4%, 5.4% and 7.0% in FIGURE 2 are assumed to represent the theoretical mol percent of melamine resulting from initial proportions of 1.0, 0.8, 0.6, 0.4 and 0.2 gram of ammonia per gram of urea respectively.

6. A process for producing a high purity melamine, said process comprising the step of converting the liquid melamine in the reaction product of urea and ammonia to its gaseous phase by bringing the concentration of said phase to a value at least equal to the theoretical mol percent of ammonia in the total reaction product under a gauge pressure of 40–100 kg./cm.$^2$ at a temperature of 420–480° C.

7. A process for producing a high purity melamine which comprises the step of reacting ammonia and urea under a gauge pressure of 50–100 kg./cm.$^2$ at a temperature of 360–400° C. in a weight ratio of from 1:5 parts of ammonia per 5 parts of urea so as to bring the concentration of gaseous phase melamine to a value at least equal to the theoretical mol percent of melamine in the total reaction product.

References Cited

UNITED STATES PATENTS 3,245,993  4/1966  Kotanaka et al. ____ 260—249.7

HENRY R. JILES, Primary Examiner

JOHN M. FORD, Assistant Examiner